May 27, 1969

R. T. H. COLLIS 3,446,556

METEOROLOGICAL LIDAR SYSTEM WITH AN IMPROVED
INFORMATION DISPLAY
Filed Aug. 2, 1965

INVENTOR
RONALD T.H. COLLIS
BY Samuel Lindenberg
Abraham Wasserman
ATTORNEYS

_United States Patent Office_

3,446,556
Patented May 27, 1969

3,446,556
METEOROLOGICAL LIDAR SYSTEM WITH AN IMPROVED INFORMATION DISPLAY
Ronald T. H. Collis, 181 N. Castanya Way,
Menlo Park, Calif. 94025
Filed Aug. 2, 1965, Ser. No. 476,627
Int. Cl. G01c *3/08;* G01w *1/00*
U.S. Cl. 356—5     3 Claims

ABSTRACT OF THE DISCLOSURE

A laser radar system is disclosed in which echoes of reflected energy are received from different ranges in a direction in which an energy pulse was transmitted. The received echoes or signals are combined with range-representing signals to provide a display of R versus log $AR^2$, where R represents range and A a signal received from range R.

---

This invention relates to meteorological instrumentation and more particularly to a laser-radar system for detecting meteorological phenomena.

With the development of laser technology, it has been proposed to use a laser radar system, hereafter referred to as lidar to determine the characteristics of the atmosphere by sensing backscattering phenomenon of the laser beam which is believed to be produced by particulate material which is present even in the clearest of air. Basically, when employing lidar, a laser beam is directed in a particular direction. Energy reflected from the various air layers, such energy being known in the art of radar as echoes, are received, displayed and analyzed to detect air characteristics, such as the attenuation factor or the presence of discontinuities, in the particular direction. Such discontinuities are considered to be of potentially great significance for the detection of the presence of clear air turbulence.

The echo signal received by a meteorological lidar is dependent upon range and upon attenuation over the two-way path $e^{-2r\sigma}$, where $r$ is range and $\sigma$ is the coefficient of extinction. The display of this signal in a conventional lineal A-scope presentation has two disadvantages. The display system requires an extended dynamic range capacity in order to handle near and far signals. Further, it is difficult to interpret by inspection the meaning of the curved trace displayed. It is even more difficult to extract quantitative data by measurement of the curved trace. The latter requirement is particularly important in using the lidar to measure visibility, for in this application it is necessary to be able to recognize homogeneity or lack of it in return from the atmosphere over an extended path, and then to measure the coefficient of extinction by reference to the attenuation shown.

Accordingly, it is an object of the present invention to provide a novel lidar display of atmospheric characteristics.

Another object of this invention is to provide a lidar atmospheric characteristic display which enables a simple interpretation of said characteristics.

A further object is the provision of a system for detecting the attenuation characteristics of the atmosphere by displaying in a novel convenient form a functional relationship between range and the intensity of received signals.

These and other objects are achieved by providing a system wherein a laser beam is directed in a particular direction in which any air discontinuities are to be detected. Echoes of reflected energy are received from the air layers in the particular direction. The received echoes are then amplified and combined with signals representative of the different ranges from the echoes received to provide a two-dimensional display. Range R is linearly displayed along one axis while the logarithm of the amplified intensity A times R squared is displayed along the other axis. Several advantages are realized by such a display. The major advantage is that the characteristics of changes in the intensity of the received echoes are more readily apparent from the display. By plotting the logarithm of the amplified intensity times range squared, the dynamic range of the display need not be too great. In addition, the coefficient of extinction over a homogeneous air section can be readily evaluated by reference to the slope of the displayed trace.

The novel features that are considered characteristic of this invention are set forth with particularity in the appended claims. This invention itself both as to its organization and method of operation, as well as additional objects and advantages thereof, will best be understood from the following description when read in connection with the accompanying drawings, in which:

Figure 1:
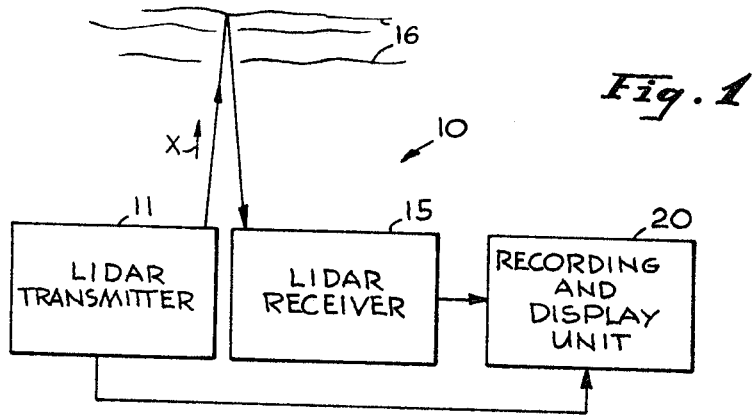
FIGURE 1 is a simplified block diagram of a meteorological lidar system.

Reference is now made to FIGURE 1 which is a simplified block diagram of a lidar system 10 for observing the atmosphere, such as detecting the pressure of any clear air turbulence in a direction indicated by arrow X and the range or distance of such turbulence from the system 10. The system includes a lidar transmitter 11 which directs bursts or pulses of laser beam of a known frequency to the air in the direction X. The rate of bursts or pulses is controlled so that between pulses, some of the energy radiated into the air is reflected back to a lidar receiver 15 from different air layers 16 in the direction X. The received echoes are then amplified in the receiver 15 and therefrom are supplied to a recording system 20. The recording system is also supplied with a synchronizing signal from the transmitter 11 so that the echoes received from the different distances or ranges may be separately recorded as a function of the time required for signals to travel to and from each one of the different distances. Such signal recording techniques are extensively used in radar systems.

Figure 2:
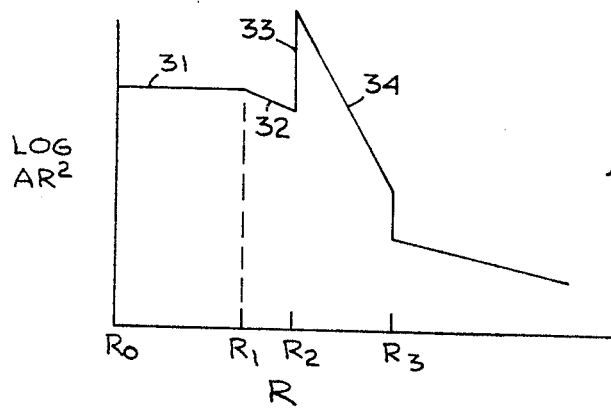
FIGURE 2 is one example of the improved display of the present invention.

It has been found that air characteristics may be most conveniently ascertained when providing a two-dimensional display in which range R is plotted against the logarithm of the amplified echoes A times $R^2$, i.e., log $AR^2$. An example of such a two-dimensional display is shown in FIGURE 2 to which reference is made herein. The abscissa linearly displays the range R and the ordinate displays the logarithm of $AR^2$.

Several advantages are realized by such a display. One major advantage is that changes in the absorption of the beam directed into the air as well as the backscattering of the beam by particulate matter at air discontinuities are indicated directly. For example, the portion of the display indicated by the horizontal line 31 represents no increase in the attenuation of the received echo from range R0 to R1. The sloping line 32 represents an increase in the attenuation of the echoes received from range R1 to R2. Then the sudden increase in the amplitude of the received echoes indicated by line 33 at a range R2 and the subsequent increase in the rate of echo attenuation between R2 and R3 as indictaed by line 34 represent an air discontinuity at range R2 and another less pronounced discontinuity at R3. Thus, by viewing the display, the characteristics of the air are clearly ascertainable. Another advantage of a display in which range R is plotted against log of $AR^2$ in that the slope of any of the lines, such as line 34, is a direct function of the extinction coefficient. Also, the homogeneity of any echoing air section is revealed by the rectilinearity of the display related to the range thereof.

Figure 3:
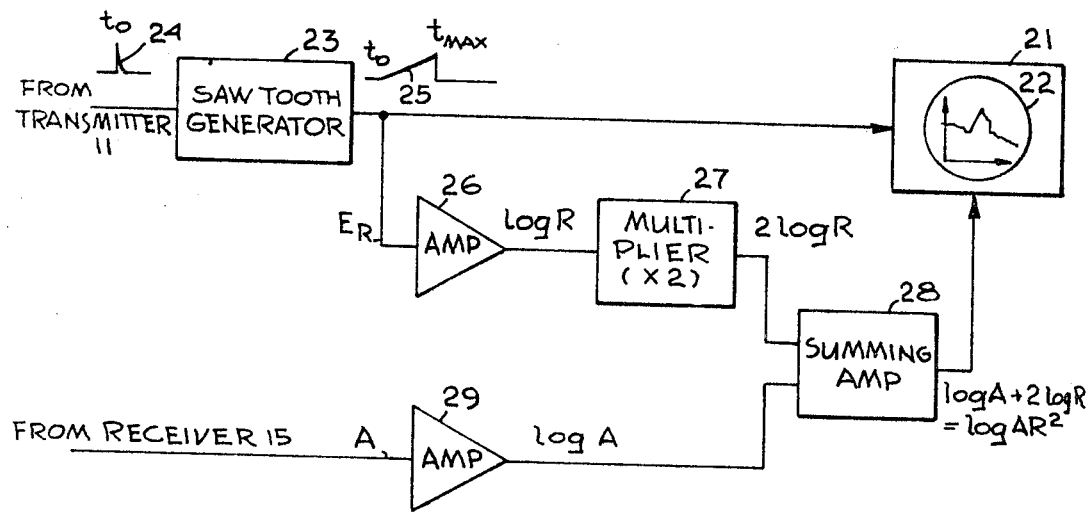
FIGURE 3 is a block diagram of circuitry for generating signals to produce the display shown in FIGURE 2.

Reference is now made to FIGURE 3 which is a block diagram of one embodiment of the display unit 20 used to produce a display of range R versus Log $AR^2$ shown in FIGURE 2. The unit includes a cathode ray display tube 21 having a display surface 22. The unit further includes a saw tooth generator 23 which is triggered by a triggering pulse 24 each time the transmitter 11 directs a burst or pulse of the laser beam into the air. The generator 23 produces a ramp voltage $E_R$ designated by numeral 25, the voltage $E_R$ proportional to range R for R is equal to $Ct/2$, where $t$ is the elapsed time from $t_0$ and C is the velocity of light. Thus the voltage $E_R$ is at any instant directly proportional to the range from which echoes are received. This voltage is supplied to the X axis deflection circuit (not shown) in order to deflect the beam (not shown) along the X axis on the display surface 22.

The voltage $E_R$ is also supplied to an amplifier 26 which produces an output which is the logarithim of the input. Since $E_R$ is proportional to range R, the output of amplifier 26 may be represented as log R. This output is then supplied to a multiplying circuit 27 which multiplies log R by two to provide a signal proportional to 2 log R which is in turn supplied to a summing amplifier 28. The amplifier 28 is also provided with the output of an amplifier 29, the latter converting the amplified echo received by the receiver 15 (see FIGURE 1). Representing the amplified echo as A, the output of amplifier 29 is log A. Thus the inputs to amplifier 28 are 2 log R and log A, which, when summed, are equal to log $AR^2$. The output of amplifier 28 is supplied to the Y axis deflection circuit (not shown) of CRT 21 to deflect the beam in the Y axis.

From the foregoing, it is thus apparent that the output of generator 23 causes the deflection of the beam of CRT 21 in the X axis to be proportional to range R and at the same time the output of summing amplifier 28 causes the deflection of the beam in the Y axis to be proportional to log $AR^2$ so that a display of log $AR^2$ v. R such as that shown in FIGURE 2, is directly produced on the display surface 22.

It should be appreciated by those familiar with the art that the signal from generator 23 representing a voltage $E_R$ proportional to range R and the signal from summing amplifier 28 representing log $AR^2$ need not be supplied to the CRT 21. Rather they may be supplied to any other recording instrument such as an X-Y plotter which would then produce the desired display. Also the signals may be supplied to a recording instrument in which the signals may be stored for future analysis and/or display. Thus, the CRT 21 should be regarded as only one example of an instrument which could be used as the recording and display unit 20 shown in FIGURE 2.

There has accordingly been shown and described herein a novel meteorological lidar system in which the information is displayed in an improved form for easy and convenient interpretation. Any air characteristics are clearly indicated by the displayed information. It should be appreciated that those familiar with the art may make modifications in the arrangements as shown without departing from the true spirit of the invention.

What is claimed is:
1. A meteorological lidar system comprising:
   laser transmitting means for transmitting a pulse of a beam of a light into the air in a predetermined direction;
   receiving means for receiving light signals reflected back from different layers of the air in said direction, the time of arrival of each light signal being a function of the range from which said light signal is reflected;
   first means coupled to said receiving means and responsive to each of said light signals for generating a signal proportional to the logarithm thereof;
   second means coupled to said transmitting means for generating a signal proportional to the time of arrival of said light signal;
   third means coupled to said second means for generating a signal proportional to twice the logarithm of the signal generated in said second means;
   fourth means coupled to said first and third means for providing a signal which represents the sum of the signals generated by said first and third means; and
   output means coupled to said second and fourth means for utilizing the signals provided thereby.
2. The meteorological lidar system of claim 1 wherein said output means includes display means responsive to the signals generated by said second and fourth means for providing a two-dimensional display wherein the signals proportional to the logarithm of said received light signal plus the signal proportional to twice the logarithm of the time of arrival of said light signal are represented along a first axis and the signal proportional to the time of arrival of said light signal is plotted along a second axis.
3. The meteorological lidar system of claim 2 wherein said display means comprises a cathode ray display tube having a display surface for providing said two-dimensional display thereon.

References Cited

UNITED STATES PATENTS 2,590,080   3/1952   Adams _____ 343—11

OTHER REFERENCES

Collis et al.: "Laser Radar From the Clear Atmosphere," Nature, Aug. 1, 1964, vol. 203, No. 4944, p. 508.

"Meteor Dust Detected by Laser Radar," Journal of the Optical Society of America, vol. 54, No. 1, January 1964, p. 135.

RONALD L. WIBERT, *Primary Examiner.*

F. L. EVANS, *Assistant Examiner.*

U.S. Cl. X.R.

73—170

UNITED STATES PATENT OFFICE
CERTIFICATE OF CORRECTION

Patent No. 3,446,556                            May 27, 1969

Ronald T. H. Collis

It is certified that error appears in the above identified patent and that said Letters Patent are hereby corrected as shown below:

In the heading to the printed specification, lines 4 and 5, "Ronald T. H. Collis, 181 N. Castanya Way, Menlo Park, Calif. 94025" should read -- Ronald T. H. Collis, Menlo Park, Calif., assignor to Stanford Reseach Institute, Menlo Park, Calif., a corporation of California --.

Signed and sealed this 5th day of May 1970.

(SEAL)
Attest:

Edward M. Fletcher, Jr.                       WILLIAM E. SCHUYLER, JR.
Attesting Officer                                Commissioner of Patents